US008948280B2

(12) United States Patent
Hammerschmidt et al.

(10) Patent No.: US 8,948,280 B2
(45) Date of Patent: Feb. 3, 2015

(54) CLOCK DETERMINATION FOR A SENSOR

(75) Inventors: Dirk Hammerschmidt, Villach (AT);
Friedrich Rasbornig, Klagenfurt (AT);
Bernhard Schaffer, Villach (AT);
Michael Strasser, Villach (AT);
Wolfgang Scherr, Villach (AT)

(73) Assignee: Infineon Technologies AG, Neubiberg (DE)

(*) Notice: Subject to any disclaimer, the term of this patent is extended or adjusted under 35 U.S.C. 154(b) by 1032 days.

(21) Appl. No.: 12/242,951

(22) Filed: Oct. 1, 2008

(65) Prior Publication Data
US 2010/0002821 A1 Jan. 7, 2010
US 2014/0294131 A9 Oct. 2, 2014

Related U.S. Application Data

(63) Continuation-in-part of application No. 11/838,475, filed on Aug. 14, 2007, now Pat. No. 8,183,982.

(30) Foreign Application Priority Data

Jul. 3, 2008 (DE) .......................... 10 2008 031 498

(51) Int. Cl.
*H04K 1/10* (2006.01)
*H04L 7/10* (2006.01)
*H04L 25/49* (2006.01)

(52) U.S. Cl.
CPC .............. *H04L 7/10* (2013.01); *H04L 25/4902* (2013.01)
USPC ......................................................... 375/260

(58) Field of Classification Search
USPC ........................................................ 375/260
See application file for complete search history.

(56) References Cited

U.S. PATENT DOCUMENTS

| 5,973,613 | A | * | 10/1999 | Reis et al. ..................... 340/7.23 |
| 6,055,145 | A | * | 4/2000 | Lagree et al. ................. 361/93.1 |
| 6,088,830 | A | * | 7/2000 | Blomgren et al. ............. 714/814 |
| 6,925,111 | B2 | * | 8/2005 | Koga ............................ 375/219 |
| 7,275,174 | B2 | * | 9/2007 | Cheung et al. ................ 713/500 |
| 7,659,716 | B2 | * | 2/2010 | Nishikawa .................... 324/244 |
| 8,050,881 | B1 | * | 11/2011 | Yeung et al. .................... 702/89 |
| 2003/0227987 | A1 | * | 12/2003 | Poletto et al. ................. 375/360 |
| 2004/0255680 | A1 | * | 12/2004 | Ortega et al. ................... 73/649 |
| 2005/0091428 | A1 | * | 4/2005 | Matsumoto et al. ............ 710/52 |
| 2005/0196059 | A1 | * | 9/2005 | Inoue et al. .................... 382/240 |
| 2005/0212932 | A1 | * | 9/2005 | Steimle et al. ................ 348/246 |
| 2006/0153041 | A1 | * | 7/2006 | Miyashita et al. ......... 369/59.22 |
| 2006/0161763 | A1 | * | 7/2006 | Ito et al. ........................ 712/241 |

(Continued)

FOREIGN PATENT DOCUMENTS

| DE | 198 27 723 | 2/1999 |
| EP | 1 918 929 | 5/2008 |
| EP | 1918929 A1 | 5/2008 |

OTHER PUBLICATIONS

German Office Action dated Mar. 16 2012, German Application No. 10 2008 064 747.0, 4 pages.

*Primary Examiner* — Santiago Garcia
(74) *Attorney, Agent, or Firm* — Patterson Thuente Pedersen, P.A.

(57) ABSTRACT

A method for determining a clock for a sensor signal which has a synchronization signal, which method involves a control unit measuring the period between a first edge and a second edge of the synchronization signal, wherein both edges are either rising or falling, and the control unit taking the period as a basis for determining a clock for sampling data in the sensor signal.

24 Claims, 3 Drawing Sheets

(56) References Cited

U.S. PATENT DOCUMENTS

| | | |
|---|---|---|
| 2006/0201931 A1* | 9/2006 | Lee et al. .................. 219/497 |
| 2006/0254369 A1* | 11/2006 | Yoon et al. ............. 73/862.041 |
| 2007/0270114 A1* | 11/2007 | Kesler et al. ............. 455/187.1 |
| 2007/0279203 A1 | 12/2007 | Thomas |
| 2008/0048772 A1* | 2/2008 | Nishikawa .................. 327/544 |
| 2008/0284585 A1* | 11/2008 | Schweitzer et al. ........ 340/539.3 |
| 2009/0058338 A1* | 3/2009 | Takeuchi ................ 318/400.13 |
| 2009/0138748 A1* | 5/2009 | Kim et al. ..................... 713/503 |
| 2009/0310727 A1* | 12/2009 | Rouis ............................ 375/360 |
| 2009/0312959 A1* | 12/2009 | Borman .......................... 702/41 |
| 2011/0074843 A1* | 3/2011 | Kusaka ............................ 347/7 |

* cited by examiner

CLOCK DETERMINATION FOR A SENSOR

RELATED APPLICATION

This application is a continuation-in-part of application Ser. No. 11/838,475 filed Aug. 14, 2007, now U.S. Pat. No. 8,183,982.

FOREIGN PRIORITY

The present application claims priority to German Application No. 10 2008 031 498 filed on Jul. 3, 2008.

FIELD OF THE INVENTION

The present invention relates to a method for determining a clock for a sensor interface having a control unit and at least one sensor and to a control unit and sensors for providing this interface.

BACKGROUND

Digital transmission of data requires a common time base for decoding the data. This determines when the data are valid in a receiver and can be sampled. If, in the case of message-oriented transmission, data packets are intended to be transmitted only upon request, the starting time for the transmission is required. This requires a further signal line if this information is not simultaneously encoded by means of the clock information. In embedded systems, this is achieved by means of a common system clock and selection lines which address data sources specifically.

In decentralized systems, multiwire buses are used, e.g. SPI (Serial Peripheral Interface), which is supported by many microcontrollers. In this case, the clock for the data transmission is sent on a separate line for the purpose of bit-synchronous data transmission. A selection line indicates the start and the end of the data transmission.

If the number of lines needs to be reduced for reasons of cost, the transmitter's clock and the starter of a transmission need to be encoded in the data to be transmitted themselves in order to allow reliable decoding in a receiver.

Economizing on external decoding hardware which needs to be used in addition to a microcontroller is an important cost factor which needs to be taken into account.

To save costs, SPC (Short PWM Code) systems are used, but these allow only very highly restricted bidirectional data transmission.

In some cases, systems are used in which a microcontroller is connected to a sensor by means of a line. The capabilities of such systems are so severely restricted, for reasons of cost, that only unidirectional data transmission is possible and only one sensor can be connected to a microcontroller by means of a line. If a plurality of sensors need to send data to the microcontroller, the microcontroller must either provide a further line to a further sensor or the line must be terminated with a gateway which can address a plurality of sensors via a plurality of lines.

SUMMARY

A method according to the invention for determining a clock for a sensor signal involves a control unit measuring the period between a first edge and a second edge of a synchronization signal from a sensor, wherein both edges are either rising or falling. The control unit takes the period as a basis for determining a clock for sampling data in the sensor signal.

BRIEF DESCRIPTION OF THE DRAWINGS

Embodiments are explained in more detail below with reference to the following drawings, in which.

DETAILED DESCRIPTION

Figure 1:
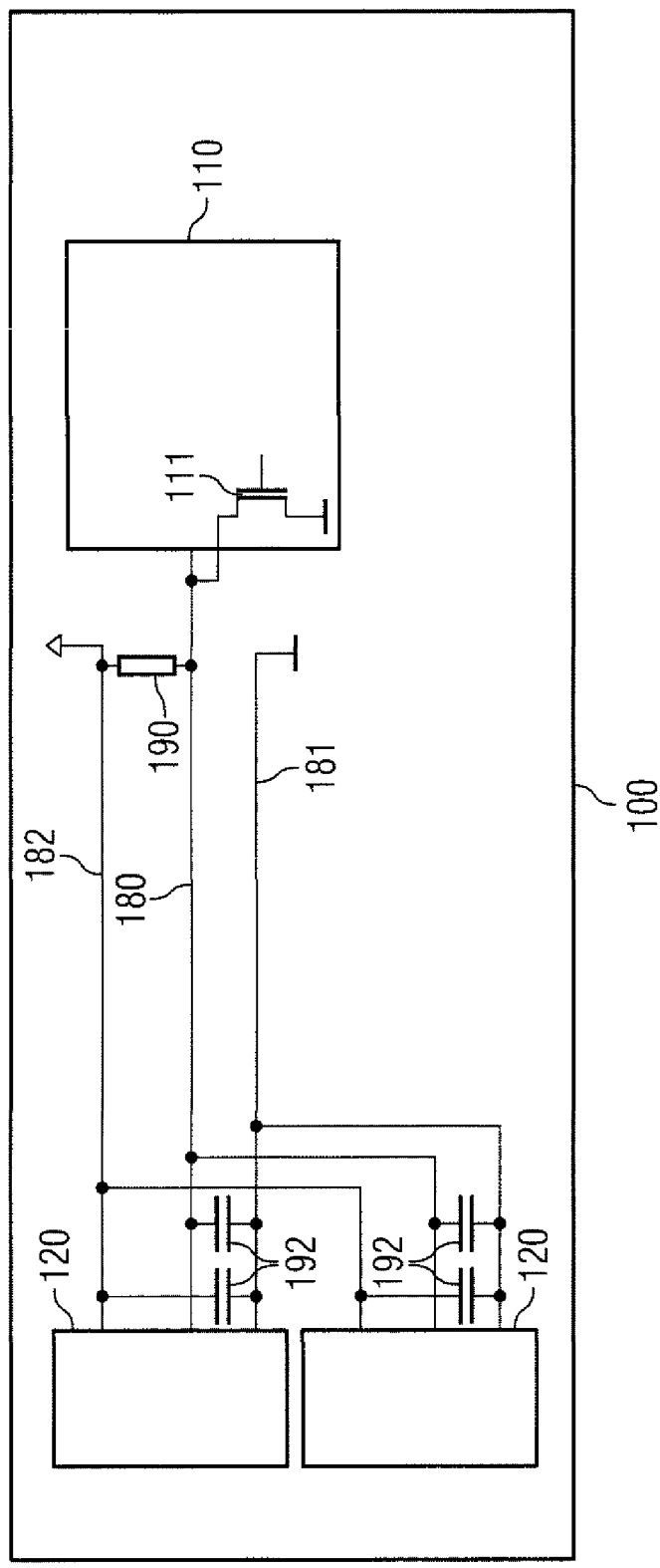
FIG. 1 shows an exemplary embodiment of a control unit which is connected to two sensors by means of a bus line.

The present invention is based on the object of providing a simple and inexpensive method and inexpensive components for clock generation which allow a control unit to interchange data with one or more sensors.

By way of example, a system may have a control unit and at least one sensor. Control units may be microprocessors whose technology is set up to combine as many logic functions as possible on one integrated circuit. By way of example, a sensor, for example a pressure sensor, a Hall sensor or an acceleration sensor, may be constructed using a semiconductor technology which may be oriented more closely to the needs of the sensor per se. The technology which is used to produce the sensors normally has a much lower packing density than the technology which is used to produce a microprocessor. It is therefore advantageous if the complexity for a communication link between one or more sensors and a controller is such that the complexity for this communication is as low as possible in the sensor. The communication link used may be bus lines. A bus line comprises at least one wire which connects at least two subscribers, a control unit and a sensor. In this connection, it is advantageous if the number of bus lines is reduced. The control unit and at least one sensor can be powered by the same supply voltage, which can be provided by a car battery, for example. The logic states on a bus line can then be stipulated by connecting the bus line either to a high potential of the supply voltage or to a low potential of the supply voltage. A sensor may have a local clock generator whose clock can be generated using an RC oscillator, for example. If the local clock generator has an internal RC oscillator, the local clock generator has a higher or lower tolerance, depending on the design. Trimming to reduce the tolerance of the local oscillator increases the costs for the sensor significantly. Other designs for the local clock generator, such as inverter delay lines, can also be produced only with high tolerances. The transmitted clock of the sensor may be a multiple of the internal clock of the sensor.

The control unit can store the clock as a clock value. If the internal clock of the control unit is higher than the clock of a sensor, the clock value can be stored as the quotient of the sensor clock and the internal clock of the control unit, for example.

The control unit can request data by sending a wake-up signal. If only one sensor is connected to the control unit by means of a bus line, a short wake-up signal from the control unit is sufficient to request data.

If only one sensor is connected to the control unit by means of a bus line, the control unit can send a modulated wake-up signal for configuring the sensor to the transmitter. Such a wake-up signal can be used to change over the measurement range of the sensor, for example, or to request another data record, for example. The wake-up signal may be PWM modulated.

If a plurality of sensors are connected to the control unit by means of a bus line, communication first requires a sensor to be selected which can send signals to a bus line. The control unit can request data and select a sensor by sending an address signal. The address signal may be PWM modulated. The address signal may be in a form such that the sensors are woken up thereby and there is no need for any further dedicated wake-up signal.

The control unit can use the address signal for configuration if the address signal is outside the address space of the sensors, that is to say that no sensor is selected by means of this address. Such an address signal can be used to change over the measurement range of the sensor, for example, or to request another data record, for example. The sensor may be in a form such that this address signal is identified as a configuration command. Depending on whether a sensor is designed to identify the address signal as a configuration command, one or more or all sensors can be addressed by the address signal.

The sensor can send the synchronization signal following reception of an address signal or of a wake-up signal.

The communication between the control unit and a sensor can be set up by virtue of the control unit first of all sending a signal which is used to address a sensor. By way of example, the signal may be a pulse which has a particular length. In this case, the address of the sensor is encoded as a pulse length. The sensor uses its local clock generator to measure the pulse length, and the sensor whose programme pattern corresponds to the pulse length is addressed. After a particular waiting time, the selected sensor sends a synchronization signal. The length of the synchronization signal is dependent on the frequency of the selected sensor's local clock generator. The length of the synchronization pulse may be a single or a multiple of the period of the local clock generator. The multiplicity can be stipulated by hard-wiring or by a value in an EEPROM store in a sensor, for example. By way of example, the synchronization signal may be in a form such that the sensor first of all changes the bus line from a high to a low state in order to enable the bus line again after a certain waiting time, so that the bus line changes from the low state to the high state. The synchronization signal is completed by virtue of the sensor forcing the bus line from a high state to a low state again. The falling edges of this synchronization signal are thus dependent on the frequency of the sensor's local clock generator. The control unit measures the period between the two falling edges of the synchronization signal and stores this period. By way of example, this may be a numerical value which is related to the control unit's local clock generator. In this context, it is advantageous that the selected sensor's local clock generator does not need to have the same high frequency of the control unit's local clock generator. The control unit takes the measured period and determines a clock for sampling the data from a selected sensor. After a waiting time, the selected sensor can start transmitting the data signal to the controller.

The sensor can send data signals following transmission of the synchronization signal.

The synchronization signal from the sensor may contain known data for identification as a synchronization signal for the control unit. In this case, the sensor can encode the synchronization signal using a particular bit pattern, so that the control unit identifies the received signal as a synchronization signal.

The method for determining a clock for a sensor may be in a form such that the sensor does not send a synchronization signal following every data request by an address signal or by a wake-up signal. By way of example, the sensor can send the synchronization signal only every second, third or fourth time. The control unit uses. The clock for sampling the data in the sensor signal is determined using the stored clock value.

The sensor can send the synchronization signal following reception of the address signal.

The control unit can interrupt the transmission of the data from the sensor following determination of the clock and can send data signals to the sensor following interruption of the transmission, wherein the data signals are dependent on the clock which is determined by reception of the synchronization signal from the selected sensor.

If the control unit has measured the clock of a sensor, during a preceding data transmission, the control unit can interrupt the transmission of the data signals from the selected sensor and can transmit to the sensor a data signal whose data are dependent on the measured clock, that is to say using the clock from a sensor's local clock generator. It is therefore not necessary for a selected sensor's local clock generator to have a low tolerance. This method allows bidirectional data transmission.

The control unit can interrupt the transmission of the synchronization signal from a sensor and can send data signals to the sensor following interruption of the transmission, wherein the data signals are dependent on the clock which is determined by storage of the clock value from a preceding data transmission from the sensor.

When the control unit has received a synchronization signal at least once from a transmitter, the control unit essentially knows the local clock of a sensor. This essentially means that the tolerances of a sensor's local clock generator, which come from the production or technology of the sensor, are known. The variations in the clock, which stem from the environment of the sensor, such as temperature or pressure, remain. Assuming that temperature and pressure or other interfering influences do not change substantially in a particular period, the control unit can therefore also interrupt the synchronization signal from the sensor in order to transmit a data signal to the selected sensor, since the sensor's local clock is known with sufficient accuracy.

The control unit can send more than one or all sensors data, or a general message (broadcast message) or a configuration command, if a specific address signal is used which selects a plurality of or all sensors. A sensor may be in a form such that the sensor is immediately ready to receive data signals following identification of the specific address signal.

A sensor can interrupt the transmission of its synchronization signal if the sensor detects activities by other subscribers on the bus. The control unit can interrupt the transmission of the synchronization signal with its own activities, or other sensors interrupt the transmission of the synchronization signal by sending their own synchronization signal. Following interruption of the transmission of the synchronization signals, the control unit sends data signals, e.g. for transmitting configuration commands or general messages.

The control unit can transmit the data signals with a default clock, which is in a form such that all tolerances of the selected sensors are taken into account. When the control unit has received a synchronization signal at least once from every connected sensor and the clock values of every sensor are known, the control unit can send the general message with a clock which is dependent on the clock values, so that a clock which is optimum for all sensors is obtained.

The data signals may be pulse-width modulated. By way of example, the data can be encoded by virtue of the period duration of a clock being known and the pulse length of a high or low signal being varied.

The address signal may be pulse-width modulated.

A sensor can be selected on the basis of the duration of the address signal.

The signals from the control unit and from the sensors may be ORed on a bus line.

The signals on the bus line can be ORed by virtue of the signal line being connected to a positive supply voltage using a resistor, for example. The control unit and the sensors merely have one transistor, whose drain or collector is connected to the bus line, for actuating the bus line. If none of the transistors, sensors or the control unit is actuated, the bus line is in a high state. As soon as at least one transistor in a sensor or in the control unit actuates the transistor, the bus line is in a low state. This state does not change if a further transistor in a sensor or in the control unit is actuated. This means that, by way of example, the control unit is easily able to actuate the transistor in the control unit in order to interrupt the data transmission of a sensor by virtue of the control unit actuating the transistor in the control unit.

All signals can be sent to a bus line.

A control unit comprises a transmitter for sending signals to a sensor, a receiver for receiving signals from the sensor, a timing circuit for measuring a period for a synchronization signal from the sensor, wherein the timing circuit measures the period between a first edge and a second edge of the synchronization signal, wherein both edges are either rising or falling, and a sampling circuit for sampling a signal to be received on the basis of the clock.

The transmitter in the control unit may be designed to send signals to a sensor, wherein the signals are dependent on the clock which is determined by reception of the synchronization signal from the selected sensor.

The transmitter may have a transistor whose collector or whose drain is connected to a bus line for sending a signal.

A sensor comprises a transmitter for sending signals to a control unit, a receiver for receiving signals from the control unit, a clock generator for generating a clock, wherein the transmitter sends a synchronization signal on the basis of the clock, wherein a period between a first edge and a second edge is dependent on the clock and wherein both edges are either rising or falling.

The transmitter may have a transistor whose collector or whose drain is connected to a bus line for sending a signal.

The receiver in the sensor can decode the intervals of time between two received edges on the basis of its own clock.

FIG. 1 shows an exemplary embodiment of an arrangement having a controller 110, two sensors 120, a bus line 180 and two supply lines 181 and 182 for applying a supply voltage. The control unit 110 communicates with the sensors 120 via the bus line 180. The bus line 180 is connected to a supply potential 182 using a resistor 190. The sensors 120 and the control unit 110 contain transistors 111 which pull the bus line 180 to the supply line 181 when one of the transistors 111 is actuated. The bus line 180 may also be in the form of a two-wire line in order to improve transmission reliability. By way of example, the two data lines can then be connected to a resistor and pulled to the respective supply voltages by two transistors. To improve the line characteristics and to suppress interference, the bus line 180 can be connected by means of capacitors 192 to the respective supply lines 182 and 181 at the inputs of the sensors 120 or at the inputs of the control unit 110.

Figure 2:
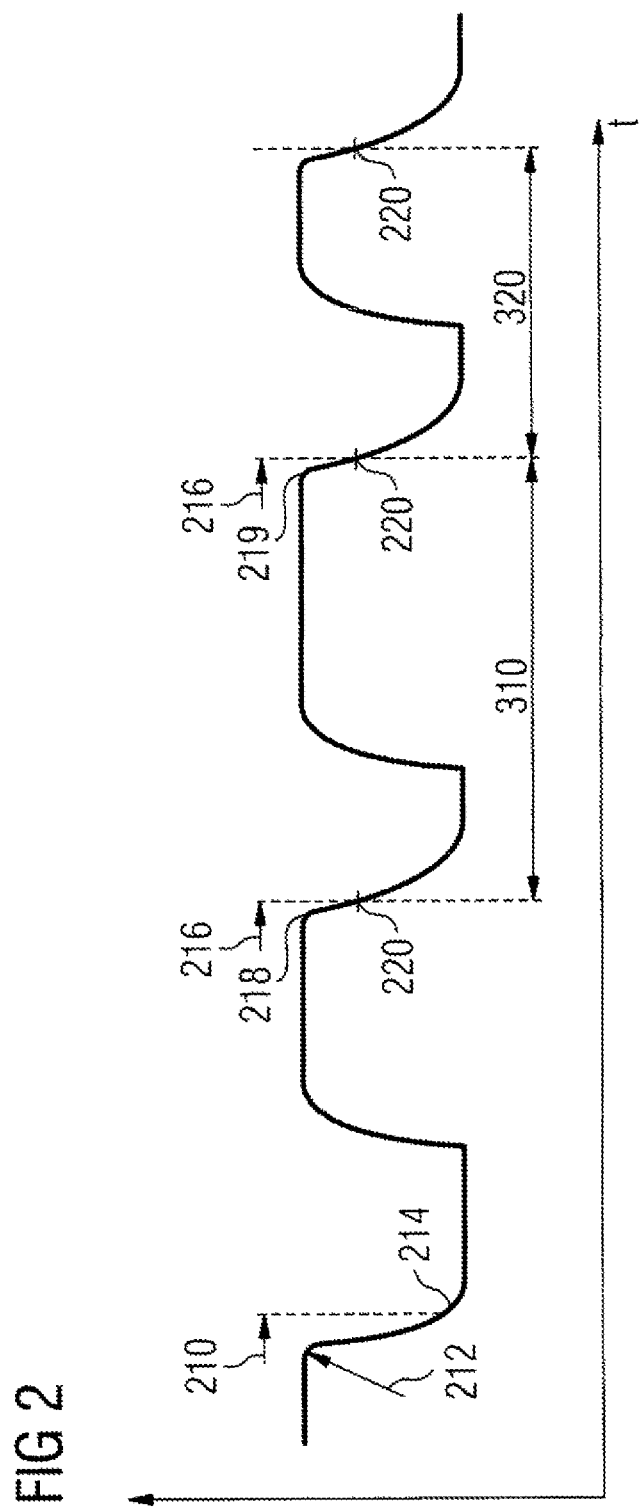
FIGS. 2 to 5 show signals on a bus line.

FIG. 2 shows a typical signal on the bus line 180. 212 identifies a time at which the control unit uses an address signal to trigger a request for data transmission to a sensor. On account of the characteristics of the transistor 111, the signal is impressed onto the bus line only after a certain delay. This delay, latency, is identified by 210 in the figure. The trigger threshold for a sensor may be at a level which is identified by 214, for example. When a control unit has cancelled the trigger signal again, the selected sensor starts to transmit the synchronization signal at the time 218. By way of example, the falling edge of the synchronization signal can be identified by the control unit at a threshold 212. After a certain time, the selected sensor 120 cancels the signal again so as then to apply the signal again at a time 219. When the falling edge has crossed a threshold 220, the control unit detects the period between the first and the second edge. This synchronization phase is identified by 310 in the graph. Using the time 310 measured by the control unit, the control unit calculates the clock which the selected sensor uses for transmitting the further data signals 320. When determining the period of the synchronization signal 310, it is not critical which edge is falling in the signal impressed by the selected sensor 120 or at which threshold 220 the control unit 110 detects the falling edges.

Figure 3:
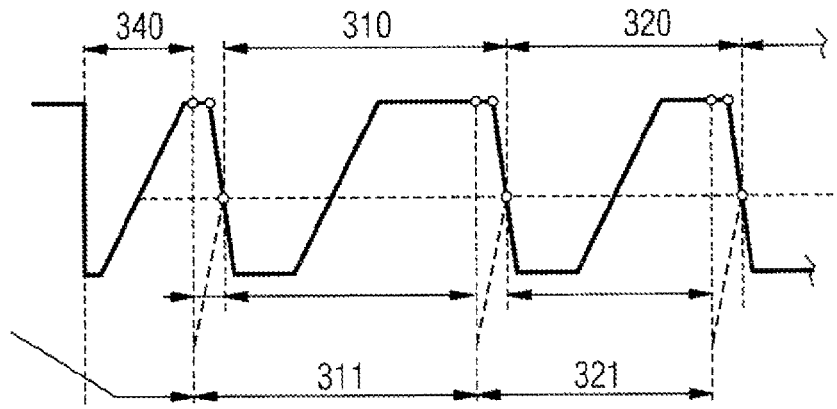

FIG. 3 shows an exemplary embodiment of a method for determining the clock, in which the address signal 340 is a simple short pulse. In this case, reference is made to a wake-up signal. Such a method can be applied when only one sensor and a control unit are connected to the bus line. The period 311 identifies the period in which a sensor 120 sends a synchronization signal. The time range 310 identifies the range in which the control unit 110 receives and evaluates the synchronization signal. The time range 321 identifies the range in which a selected sensor sends a data signal. The period 320 identifies the range in which the control unit receives the data signal from the selected sensor.

Figure 4:
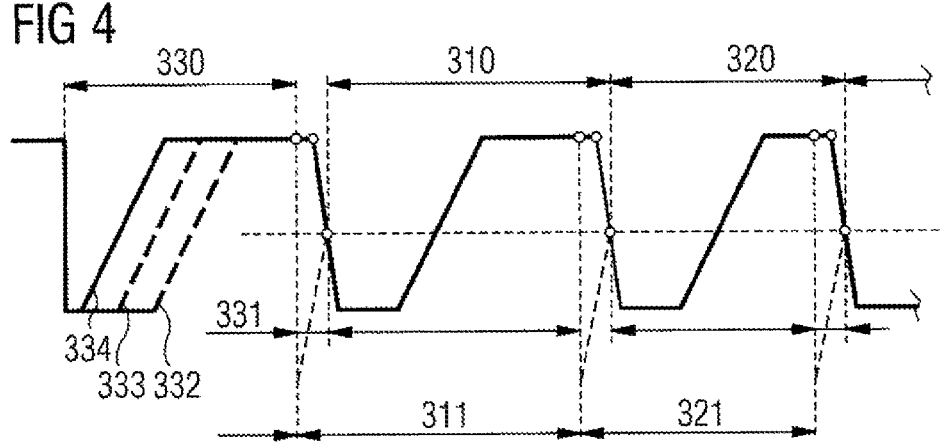

The curve in FIG. 4 is used to explain another exemplary embodiment. The signal in the period 330 in FIG. 4 shows an exemplary embodiment of a PWM-encoded address signal. What are shown are a rising edge 334 (shown in a solid line) and two rising edges 332, 333 (shown in dashed lines). The control unit 110 starts the request for data transmission to a sensor by pulling the bus line 180 to a low potential. Depending on whether a first, a second or a third sensor 120 is intended to be chosen, the edge rises again at an earlier or later time, which are identified in FIG. 4 by the identifiers 332, 333 and 334. When the address signal has expired, the selected transmitter 120 undertakes control of the bus by forcing the bus to a low potential. In this case too, the phase 310 or 311 identifies the synchronization signal. Following completion of the synchronization signal 310, 311, the selected sensor 120 starts to transmit the data signal 320, 321.

Figure 5:
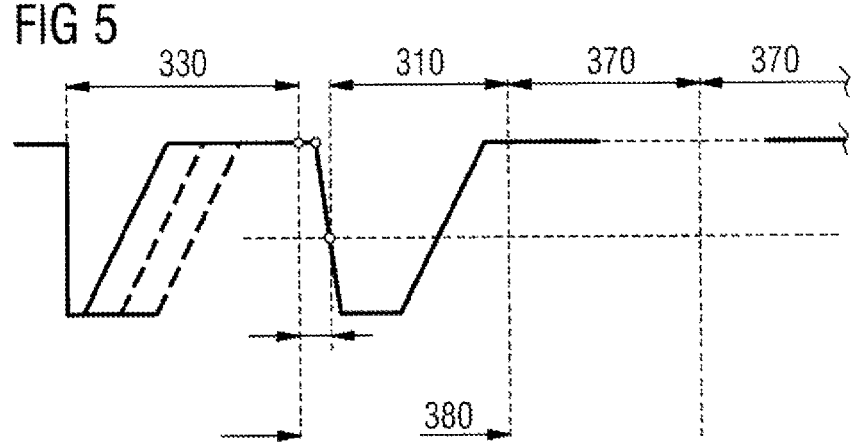

FIG. 5 shows further exemplary embodiments using a curve. The control unit 110 starts a request for data transmission using address signal 330, which is encoded as PWM in this exemplary embodiment, the possible edges 332, 333 and 334 identifying the addresses of three sensors 120 which are to be selected. When the address signal has expired, the selected sensor 120 starts by virtue of the selected sensor 120 sending the synchronization signal 310. In this exemplary embodiment, the control unit 120 interrupts the synchronization signal before it has expired by virtue of the control unit 120 sending data 370 to the selected sensor 120. The selected sensor identifies from a falling edge of the transmitted signal 370 that the transmission of the synchronization signal has been interrupted, and switches to reception in order to receive the data signals from the control unit 110.

The invention claimed is:

1. A method for determining a clock of a sensor, the method comprising:
   transmitting a synchronization signal by a sensor in response to a trigger signal sent by a control unit;
   receiving the synchronization signal by the control unit;
   measuring, by the control unit, a period between a first edge and a second edge of the synchronization signal, wherein the edges are either rising or falling;
   determining, by the control unit, a local clock of the sensor from the period; and
   using, by the control unit, the local clock to sample data in a data signal received by the control unit from the sensor.

2. The method according to claim 1, further comprising storing the local clock as a clock value by the control unit.

3. The method according to claim 1, further comprising requesting data by sending a wake-up signal by the control unit.

4. The method according to claim 3, further comprising sending the synchronization signal by the sensor following reception of the wake-up signal.

5. The method according to claim 1, further comprising requesting data and selecting the sensor by sending an address signal by the control unit.

6. The method according to claim 5, wherein the address signal is pulse-width modulated.

7. The method according to claim 5, further comprising sending the synchronization signal by the sensor following reception of the address signal.

8. The method according to claim 5, further comprising selecting the sensor based on a duration of the address signal.

9. The method according to claim 1, further comprising sending a data signal by the sensor following transmission of the synchronization signal.

10. The method according to claim 9, wherein the data signal is pulse-width modulated.

11. The method according to claim 1, wherein the synchronization signal from the sensor comprises known data for identification as a synchronization signal by the control unit.

12. The method according to claim 1, further comprising:
   interrupting transmission of a data signal from the sensor by the control unit; and
   sending data signals to the sensor by the control unit, wherein the data signals are dependent on the local clock.

13. The method according to claim 12, further comprising applying a signal from the control unit and a signal from the sensor as OR signals on a bus line.

14. The method according to claim 1, further comprising:
   determining the local clock from a stored clock value from a previous data transmission from a sensor;
   interrupting transmission of the synchronization signal from the sensor by the control unit; and
   sending data signals to the sensor by the control unit, wherein the data signals are dependent on the local clock.

15. The method according to claim 14, further comprising applying a signal from the control unit and a signal from the sensor as OR signals on a bus line.

16. The method according to claim 1, further comprising sending signals to a bus line.

17. A control unit system comprising:
   a transmitter configured to send signals including a trigger signal to a sensor to provide at synchronization signal;
   a receiver configured to receive signals including the synchronization signal from the sensor;
   a timing circuit configured to determine a local sensor clock based on a period of a synchronization signal received from the sensor, wherein the timing circuit is configured to measure the period between a first edge and a second edge of the synchronization signal, and wherein both edges are either rising or falling; and
   a sampling circuit configured to sample, on the local sensor clock, a data signal to be received from the sensor.

18. The control unit according to claim 17, wherein the transmitter is configured to send signals dependent on the local sensor clock.

19. The control unit according to claim 17, wherein the transmitter comprises a transistor, and wherein one of a collector or a drain of the transistor is coupled to a bus line configured to send a signal.

20. A sensor system comprising:
   a sensor;
   a clock generator configured to generate a clock in the sensor system;
   a receiver configured to receive a trigger signal from a control unit separate from the sensor system; and
   a transmitter configured to send signals from the sensor system to the control unit in response to the trigger signal from the control unit, wherein the transmitter is configured to send a synchronization signal based on the dock, and wherein a period between a first edge and a second edge of the synchronization signal is dependent on the clock and both edges are either rising or falling.

21. The sensor according to claim 20, wherein the transmitter comprises a transistor having one of a collector or a drain coupled to a bus line configured to send a signal.

22. The sensor according to claim 20, wherein the receiver is configured to decode intervals of time between two received edges based on a receiver clock.

23. The method of claim 1, wherein a length of the synchronization pulse is dependent on a frequency of the local clock.

24. The method of claim 23, wherein the length of the synchronization pulse is a single or a multiple of the period.

* * * * *